United States Patent [19]

Ehsani

[11] Patent Number: 5,410,235
[45] Date of Patent: * Apr. 25, 1995

[54] METHOD AND APPARATUS FOR SENSING THE ROTOR POSITION OF A SWITCHED RELUCTANCE MOTOR

[75] Inventor: Mehrdad Ehsani, Bryan, Tex.

[73] Assignee: The Texas A&M University System, College Station, Tex.

[*] Notice: The portion of the term of this patent subsequent to Mar. 1, 2011 has been disclaimed.

[21] Appl. No.: 203,946

[22] Filed: Mar. 1, 1994

Related U.S. Application Data

[63] Continuation of Ser. No. 951,590, Sep. 25, 1992, Pat. No. 5,291,115.

[51] Int. Cl.$^6$ ............................................. G05B 11/00
[52] U.S. Cl. ................................. 318/701; 318/254; 318/608
[58] Field of Search ............... 318/700, 701, 721, 696, 318/685, 138, 254, 439, 671, 683, 608, 807, 809

[56] References Cited

U.S. PATENT DOCUMENTS

| | | |
|---|---|---|
| 4,520,302 | 5/1985 | Hill et al. ............................ 318/696 |
| 4,611,157 | 9/1986 | Miller et al. ........................ 318/696 |
| 4,772,839 | 9/1988 | MacMinn et al. .................. 318/696 |
| 4,959,596 | 9/1990 | MacMinn et al. .................. 318/254 |
| 5,072,166 | 12/1991 | Ehsani ................................. 318/696 |
| 5,097,190 | 3/1992 | Lyone et al. ........................ 318/701 |
| 5,107,195 | 4/1992 | Lyons et al. ........................ 318/701 |
| 5,140,234 | 8/1992 | Lyons et al. ........................ 318/701 |
| 5,140,244 | 8/1992 | Lyons et al. ........................ 318/701 |
| 5,291,115 | 3/1994 | Ehsani ................................. 318/701 |

OTHER PUBLICATIONS

S. R. MacMinn et al., "Application of the Sensor Integration Techniques to the Switched Reluctance Motor Drive", *IEEE Industry Applications Conference Record* 1988, pp. 584–588.

J. T. Bass, et al., "Robust Torque Control of Switched Reluctance Motors Without a Shaft Position Sensor", *IEEE Transactions on Industrial Electronics*, vol. IE–33, No. 3, pp. 212–216, Aug. 1986.

J. T. Bass, et al., "Simplified Electronics for Torque Control of Sensorless Switched Reluctance Motor", *IEEE Transactions on Industrial Electronics*, vol. IE–34, No. 2, pp. 234–239, May 1987.

*Primary Examiner*—Jonathan Wysocki
*Attorney, Agent, or Firm*—Baker & Botts

[57] ABSTRACT

Apparatus and method for detecting rotor (12) position in a switched reluctance motor (18) having multiple stator phases (A-A', B-B', and C-C'). A multiplexer (48) intermittently connects a known resistor (54) to a non-conducting stator phase. Circuitry (62 and 68) detects the amplitude of the current passing through the resistor (54) and the phase difference between the varying voltage and the current passing through resistor (54). The resulting signal is proportional to the position of rotor (12).

8 Claims, 4 Drawing Sheets

METHOD AND APPARATUS FOR SENSING THE ROTOR POSITION OF A SWITCHED RELUCTANCE MOTOR

This application is a continuation of U.S. application Ser. No. 07/951,590, filed Sep. 25, 1992, by Mehrdad (NMI) Ehsani and entitled "Method and Apparatus for Sensing the Rotor Position of a Switched Reluctance Motor Without a Shaft Position Sensor", now U.S. Pat. No. 5,291,115, issued Mar. 1, 1994.

TECHNICAL FIELD OF THE INVENTION

This invention relates to variable speed motor drives, and more particularly relates to a method and system for determining the rotor position of a switched reluctance motor.

BACKGROUND OF THE INVENTION

The switched reluctance (SR) motor has become widely used for its high efficiency and flexible control characteristics. The SR motor does not require permanent magnets and produces torque by the variable reluctance principle. In operation of the SR motor, it is necessary to synchronize phase excitation pulses to the position of the rotor. The rotor position information is thus necessary to determine the switching instants for proper control of speed, torque, and torque pulsations.

Previously, shaft position transducers have been commonly employed to determine the rotor position in SR motors. Such transducers have included a magnetized ring along with Hall effect sensors or of opto-interrupters with a slotted disk that produces pulses at particular intervals. Such position sensors, however, are relatively expensive and may tend to reduce the system reliability due to electromagnetic interference and temperature effects.

An indirect method of rotor position sensing is described in MacMinn et al., "Application of the Sensor Integration Techniques to the Switched Reluctance Motor Drive," IEEE Industry Applications Conference Record 1988, pp. 584–588. In this technique, short duration, low level voltage pulses derived from the commutating signals are applied to the two unenergized phases of an SR motor and the resulting current pulses are measured to obtain an indication of the impedances of the unenergized motor phases and an estimation of the rotor angle. The circuitry for implementing this method, however, is rather complex and relatively expensive.

Other techniques for indirectly sensing the position of an SR motor include dwell angle modulation in an "open loop" system, as described in J. T. Bass, et al., "Robust Torque Control of Switched Reluctance Motors Without a Shaft Position Sensor", IEEE Trans. on Ind. Elec., Vol. 1E-33, No. 3, pp. 212–216, Aug. 1986; and in J. T. Bass, et al., "Simplified Electronics for Torque Control of Sensorless Switched Reluctance Motor", IEEE Trans on Ind. Elec., Vol. 1E-34, No. 2, pp. 234–239, May 1987. Further, U.S. Pat. No. 5,072,166 by the present applicant, entitled "Position Sensor Elimination Technique for the Switched Reluctance Motor Drive", issued Dec. 10, 1991, describes an indirect rotor detection technique which senses the motor phase inductance by generating a frequency modulated signal from an oscillator connected to the stator windings.

Each of the above-noted prior art techniques, however, have not been wholly satisfactory due either to excessive complexity, inaccuracies caused by induced parasitic currents, or lack of fully adequate running performance over a wide range of torque load and inertia. A need has thus arisen for a simple, cost-effective, technique to detect the rotor position of an SR motor.

SUMMARY OF THE INVENTION

In accordance with the present invention, a method and system are provided for indirectly detecting the rotor position of a switched reluctance motor having multiple stator phases energized in synchronism with the position of the motor. A periodically varying signal is applied to a non-excited stator of the motor. A predetermined characteristic of the signal is then detected. An indication is generated of the position of the rotor independent upon the detected characteristic of the signal. In one aspect of the invention, the predetermined characteristic comprises the amplitude of the current drawn by the non-excited stator. In another aspect of the invention, the predetermined characteristic comprises the phase difference between the voltage and current of the non-excited stator and a resistance connected with the non-excited stator.

In yet another aspect of the present invention, a method and apparatus is provided to detect the rotor position of a switched reluctance motor which has multiple stator phases energized in synchronism with the position of the rotor. A known resistance is connected with a non-conducting stator phase of the motor. A periodically varying voltage is applied to the known resistor and the non-conducting stator phase. The amplitude of the current drawn by the non-excited stator is detected, along with the phase difference between the varying voltage and the current passing through the resistance. The combination of the detected amplitude and phase difference is a function of the inductance of the non-conducting stator phase and therefore, a function of the position of the rotor.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
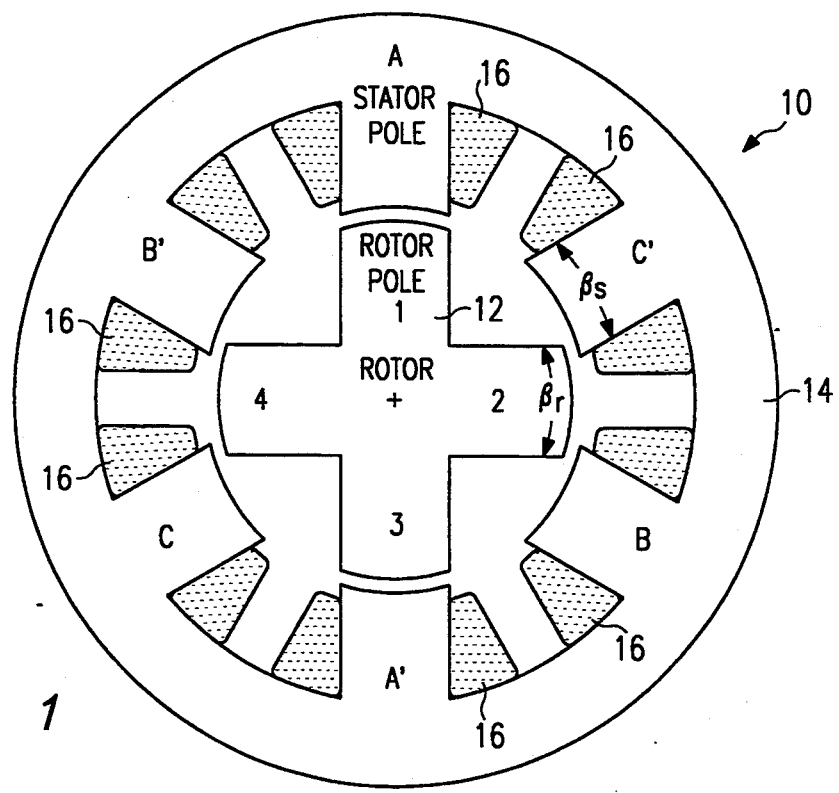
FIG. 1 illustrates a schematic diagram of a switched reluctance (SR) motor.

FIG. 1 illustrates a switched reluctance (SR) motor 10 having a rotor 12 and a stator 14. Rotor 12 has four poles 1–4 and the stator 14 has six poles A–A', B–B', and C–C'. It will of course be understood that the present invention may be used with SR motors having any desired number or combinations of rotor and stator poles.

Phase windings 16 are wound around the stator poles A–C. As is known, the windings for pairs of diametrically opposite stator poles are normally wired together and the pairs are energized by respective ones of three phases of current. The phase inductance varies appreciably as a function of rotor 12 position, so that when a pair of phase windings are energized, a torque is generated which tends to align the rotor poles with the two stator poles having the energized windings.

The efficiency of the SR motor in low to medium power applications is comparable to and often better than induction or permanent magnet motors. For example, the temperature sensitivity, demagnetization limits, and brittleness associated with permanent magnet motors are absent in SR motors. The wide speed range is an additional advantage of SR motors over permanent magnet motors. SR motors are thus highly suitable for drive applications in automobiles and the like, due to the SR motor's high performance, light weight, and low cost.

The flexibility and control in four quadrants with regeneration and dynamic breaking in SR motors can also be effectively used in the compressor motor for the air conditioning system of the automobile. Moreover, an adjustable speed SR motor is more economical and efficient than a DC motor in driving the cooling fan of an automotive system, particularly as the speed of the SR motor may be adjustable according to the temperature of the automobile engine, thus saving system energy loss. SR motors are also adaptable for many other uses, such as for the starter of the combustion engine of the conventional automobile and the like.

To apply a relatively constant torque to the rotor 12 for rotation in either a forward or reverse direction, the phase windings are energized in sequence as a function of the relative angular position of the rotor 12 with respect to the stator 14. As noted, this rotor position sensing has previously been done using optical or Hall sensors not in close proximity to the rotor 12, or by other indirect methods. The present invention applies a varying voltage to a non-energized or non-excited phase winding and detects the resulting amplitude and-/or phase differences associated with the signal in order to detect the value of the inductance of the stator windings and therefore, information regarding the position of the rotor.

Torque in the SR motor is developed by the tendency of the magnetic circuit to adopt a configuration of minimum reluctance and is independent of the direction of current flow. Consequently unidirectional currents are required and a simple configuration is sufficient as the drive circuitry. The torque in terms of co-energy W is, $$T(\theta, i) = \frac{\partial W(\theta, i)}{\partial \theta}$$

where $\theta$ is the angle describing the rotor position and $i$ is the current in the stator windings. Under the. simplifying assumption of no magnetic non-linearity the torque equation becomes, $$T(\theta, i) = \frac{1}{2} i^2 \frac{\partial L}{\partial \theta}$$

where L is the self inductance of the stator phase at any value of $\theta$.

Figure 2A:
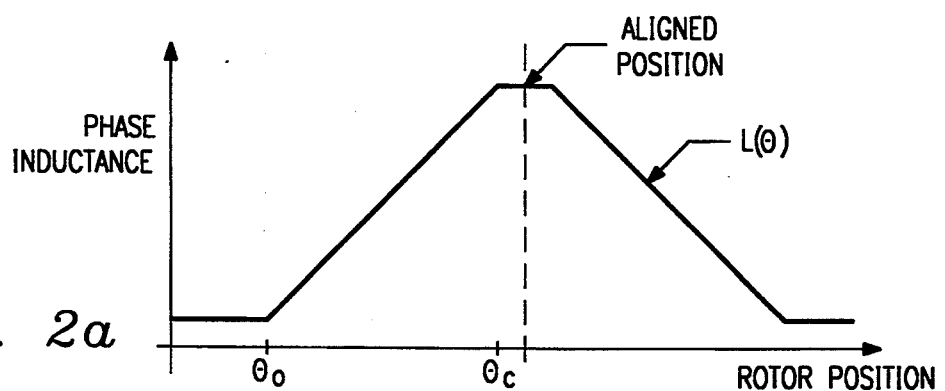
FIGS. 2(a) and 2(b) are waveforms which illustrate the idealized inductance profile of an SR motor, and the coincidence of the phase current with the decreasing inductance.
Figure 2B:
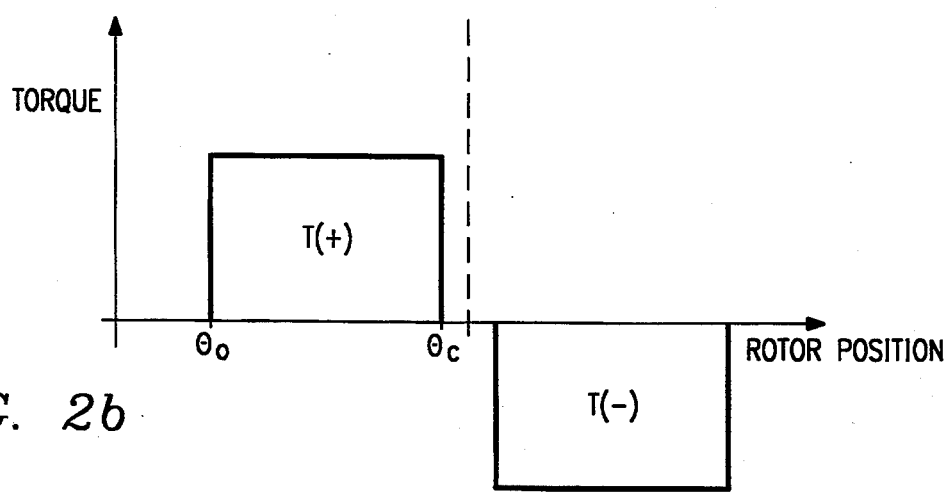

The idealized inductance profile of an SR motor is shown in FIG. 2(a). For positive or motoring torque in the forward mode of operation, phase current is switched such that it flows during the rising inductance period and for braking, phase current must coincide with the decreasing inductance period as shown in FIG. 2(b). In the 3rd and 4th quadrant operations, the forward braking mode becomes the positive torque producing region (reverse motoring), while the forward motoring portion (between $\theta_o$ and $\theta_c$) becomes the positive torque producing region (reverse regeneration) in the reverse direction.

Typically, an SR motor is run in the forward motoring mode, but the energy stored in the magnetic field at the end of a conduction period of a particular phase is not necessarily dissipated. The energy Can be pumped back to the supply at the end of the period of rising inductance with the appropriate converter circuit. To maximize motoring torque, the current in a phase should be switched on during the constant inductance region so that the current can build up when the period of increasing inductance starts. In addition, the current should be switched off before the end of the increasing inductance period to allow the current to decay fully so that no negative torque is produced. Each stator phase of an SR motor must be energized by an unidirectional current pulse while the rotor is appropriately positioned relative to the stator.

Figure 3:
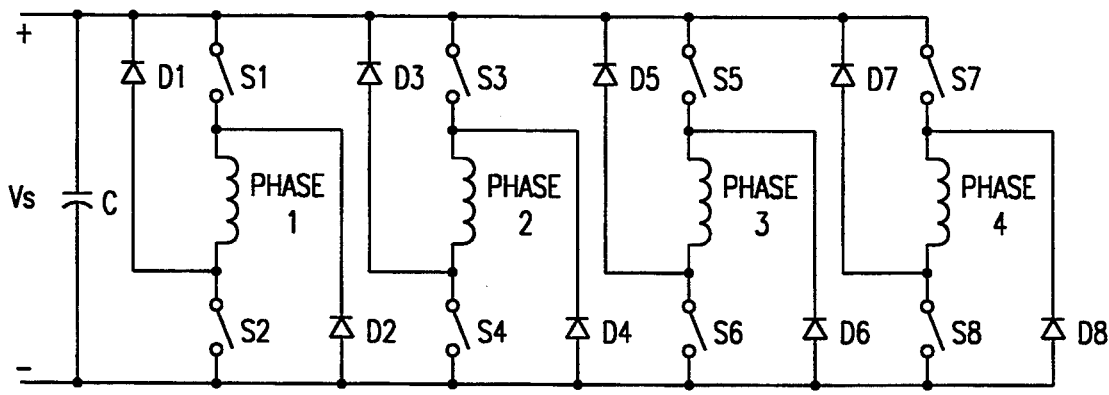
FIG. 3 illustrates a typical converter configuration for a four-phase SR motor.

A number of converter configurations are known which selectively energize the SR motor windings in response to phase commutating signals. For example, reference is made to FIG. 2 of previously noted U.S. Pat. No. 5,072,166, the description of which is incorporated herewith. FIG. 3 illustrates a common converter configuration for switching a four-phase SR motor. As may be seen in FIG. 3, voltage may be applied from a DC supply which may include a full-wave bridge rectifier for converting standard 120 VAC household current to direct current. Preferably, two switching devices are used for each phase of the motor to be controlled. For example, switches S1 and S2 are connected on opposite sides of phase 1, while switches S3 and S4 are connected on opposite sides of phase 2 of the motor. The switches may comprise any suitable electronic switches such as power field-effect transistors or the like. Diodes D1–D7 are connected to each of the phases for returning power to the power supply when the switches S1–S8 are turned off, in order to improve the electrical efficiency of the SR motor.

A high voltage integrated circuit (HVIC) driver chip IR-2110 manufactured by International Rectifier may be used to drive the gates of each of the upper switches S1–S7. The HVIC eliminates the need for separate floating power supplies for each of the upper switches. A bootstrap technique is often used to provide a floating bias supply in the IR-2110 in combination with level-shifting a ground reference to input signal. The IR-2110 is normally configured to directly drive a pair of power MOSFETs or MOSIGTs connected in half-bridge or other configurations.

Figure 4:
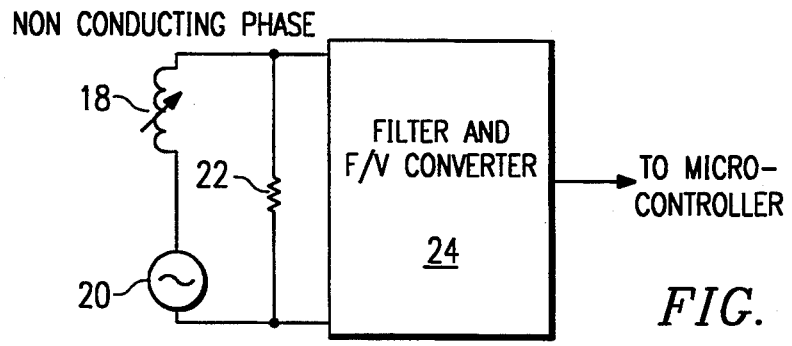
FIG. 4 illustrates a block diagram of the first embodiment for sensing the position of an SR motor by detecting amplitude variations.

FIG. 4 illustrates a diagram of an embodiment of the invention. As known, the inductance of a stator phase is a function of the rotor position. The phase inductance is maximum when the stator and rotor poles are aligned and is minimum when the poles are unaligned. In an SR motor, since only one phase is conducting at any instant, the other non-conducting phases may be used to sense the position of the motor by connecting suitable sensing circuitry.

The non-conducting phase may be modeled as a varying inductor with negligible resistance and is illustrated by number 18 in FIG. 4. When inductor 18 is energized by a sinusoidal or other periodically varying voltage from supply 20, a predetermined characteristic of the resulting signal may be detected to determine the inductance. For example, the current drawn by the inductor 18 varies in peak amplitude as the motor rotates. This variation in amplitude of the current signal is inversely proportional to the value of the inductance. Hence, the amplitude of the current signal gives information regarding the rotor position.

In the embodiment shown in FIG. 4, a resistance 22 is connected across the non-conducting phase inductor 18 and the voltage supply 20, which is connected across the inputs of a voltage to frequency converter 24. The output of converter 24 is thus a frequency signal whose frequency may be measured by a microcontroller or by a high speed timer. The accuracy of this sensing technique depends upon the frequency of the varying voltage supply 20. The higher the frequency used, the higher the resolution of position detection. Filtering is provided by the converter 24 to eliminate unwanted noise from adjacent stator phases.

Figure 7:
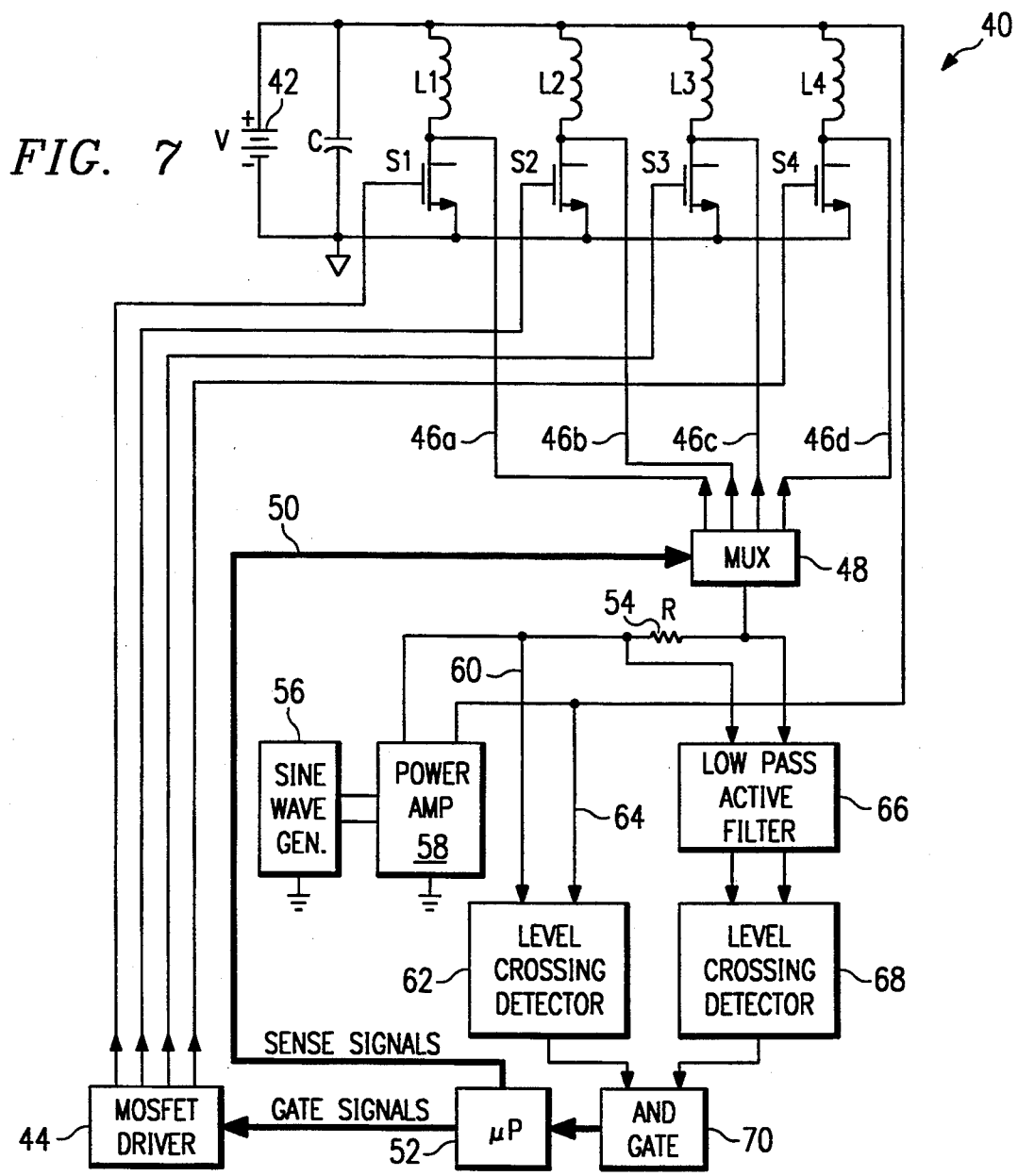
FIG. 7 is a block diagram illustrating the preferred embodiment of the invention which combines detection of amplitude and phase differences of the signals applied to the non-excited stator windings of an SR motor.

In operation of the circuitry shown in FIG. 4, a multiplexer, to be shown and described with respect to FIG. 7, sequentially connects the voltage supply 20 to a non-conducting stator phase. A microcontroller is used to control the timing of the multiplexer. For a four-phase motor, if the torque producing current is flowing through Phase A, then the multiplexer connects Phase C to the voltage supply 20 and to the frequency convertor 24. Rotor position is detected using information from Phase C while the Phase A coil is conducting the motor current. When Phase A is switched off and Phase B is connected to the DC bus, the microcontroller switches the multiplexer to switch the position measuring circuitry of FIG. 4 from Phase C to Phase D and the sequence continues. The position information encoded for each non-conducting phase is filtered and translated into a variable frequency signal by converter 24. The high frequency signal is clocked by a high speed timer of the microcontroller to recover the rotor position information. This information is then used to control the commutation of the SR motor to provide control thereof.

Figure 5:
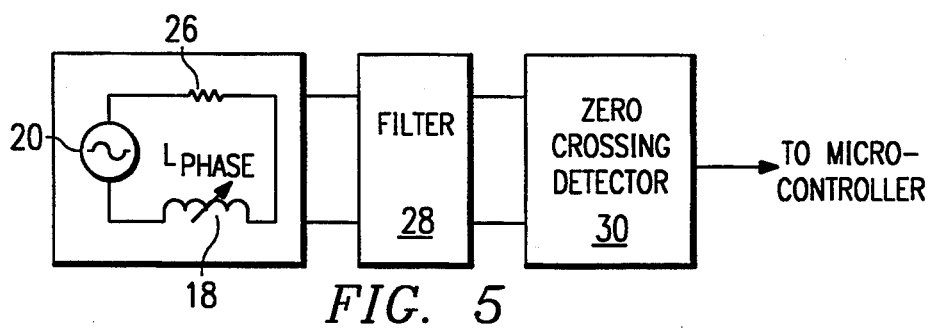
FIGS. 5 and 6 illustrate second embodiments of the invention illustrating the detection of SR motor rotor position by detecting phase differences between the current and voltage of a non-excited stator winding.

FIG. 5 illustrates another embodiment of the present invention wherein the predetermined signal characteristic sensed is a phase difference, rather than the amplitude sensed by the circuit of FIG. 4. As noted, the phase inductance of the SR motor varies significantly between the aligned and unaligned rotor positions. The ratio of maximum to minimum inductance in an SR motor is usually three or greater. FIG. 5 illustrates a technique using a phase modulator to generate a signal proportional to the inductance variation of the motor.

Again, in this embodiment, since only one phase of the motor is conducting at one instant, one of the other non-conducting phases is used to sense the position of the rotor by connecting suitable sensing circuits. In FIG. 5, a known resistance 26 is connected in series with the phase inductor 18. As previously noted, the phase inductor 18 is a varying inductor with negligible resistance and models the non-conducting phase of the SR motor. The varying voltage supply 20 is connected in series with the inductor 18 and in series with resistance 26. The voltage supply 20 will normally provide a sinusoidal waveform, but it will be understood that the waveform could comprise other varying waveforms such as a square wave, triangular wave, or any other desirable wave shape. Since the current generated by the sensing waveform supply 20 is negligible when compared to the current in the excited stator phases, no reflections or coupling are generated by the sensing circuit which effect the operation of the SR motor.

When the phase inductor 18 and 26 resistance are energized by the voltage from voltage supply 20, the phase difference between the voltage and the inductor current is a function of the varying inductance. The output from the sensing circuitry is applied through a filter 28 and to a zero crossing detector 30. The output of the detector 30 is indicative of the phase difference and is applied to the microcontroller wherein the phase difference is digitized. A high speed timer in the microcontroller clocks the phase modulated signal to give a digital count which corresponds to the instantaneous rotor position. The digital count may then be used to control the operation of the motor in the known manner.

FIG. 5 illustrates the present circuit connected to only one phase of the motor, it being understood that the other phases have identical circuits which are connected to the stator phases by a multiplexer in their unexcited states. In initial operation of the motor, the microcontroller determines which stator phases should be excited to deliver torque in the desired direction by checking the inductance of all three phases. The phase difference between the current and the voltage across resistance 26 (R) in the circuit of FIG. 5 is given by, $$\Phi = \arctan\left(\frac{\omega L}{R}\right)$$

The variation of phase difference is maximum if resistance R is chosen as the geometric mean of minimum and maximum inductive reactance; i.e., $$R = \sqrt{(\omega L\max) \times (\omega L\min)}$$

Figure 6:
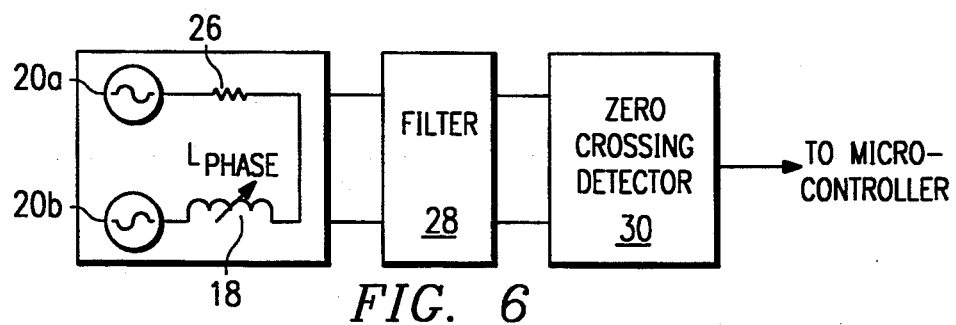

The resolution of the technique may be further increased by using the modification shown in FIG. 6, wherein like numbers are used for like and corresponding parts. In this embodiment, two voltage supplies 20(a) and 20(b) are utilized, with the voltage supplies being 180° out of phase. The voltage from supply 20(a) is applied to the known resistance 26, while the 180° out of phase voltage from supply 20(b) is applied to the inductor 18. The output voltage $V_o$ applied to the filter 28 will thus have a phase difference with respect to the supply voltage equal to, $$V_o = V\left(\frac{R + j\omega L}{R - j\omega L}\right)$$

The phase difference can be given by:

$$2\left(\arctan\left(\frac{\omega L}{R}\right)\right)$$

Again, the output of the zero crossing detector 30 of FIG. 6 will be representative of the phase difference between the supply voltage and the voltage across resistance 26. The phase difference is then applied to the microcontroller where it is digitized and used to clock a high speed timer to provide a digital count corresponding to the instantaneous rotor position. The frequencies of the voltage supplies 20(a) and 20(b) are different than the frequency of the motor commutating signals. Higher frequencies of the voltage supplies 20(a) and 20(b) are desirable to increase the resolution of the position detection.

FIG. 7 is a block diagram of the preferred embodiment of the invention, which combines the amplitude detection and phase difference detection of the circuits of FIGS. 4-6. Referring to FIG. 7, a rotor position detection system in accordance with the present invention is illustrated with a four-phase SR motor designated generally by number 40. A voltage supply 42 is applied to energize the four stator windings L1-L4. MOSFET switches S1-S4 are connected in series with the stator windings and are controlled by a MOSFET driver 44 to control the excitation of the stator phases in the known manner.

Each of the stator windings L1-L4 are connected by leads 46(a)-46(d) to a multiplexer 48. Multiplexer 48 sequentially connects unexcited stators to the rotor position sensing circuitry. Timing of the multiplexer is controlled through line 50 from a microprocessor 52. The output of microprocessor 52 generates gate signals which drives the MOSFET driver 44 in order to control the timing and operation of the SR motor.

A predetermined resistance 54 is connected to the output of the multiplexer 48 and is connected to receive a sinusoidal or other suitable varying waveform from a wave generator 56 through a power amplifier 58. The terminal of resistance 54 remote from the multiplexer 48 is connected through a lead 60 to a level crossing detector 62. The high ends of the stator coils L1-L4 are applied to the level crossing detector via lead 64. A low pass active filter 66 is connected across the terminals of resistance 54 and the output of the filter 66 is applied to a level crossing detector 68. The outputs of the level crossing detectors 62 and 68 are applied to an AND gate 70 which generates an indication of the phase differences between the signals to the microprocessor 52.

In operation of the circuitry shown in FIG. 7, the unexcited stator coil is connected by the multiplexer 48 to the sensing circuitry. The constant frequency wave generator 56 drives the unexcited phase coil and the circuitry measures the instantaneous phase shift of the current and voltage in the phase. In addition, as will be subsequently described, the amplitude of the phase current is detected to provide a reading of the instantaneous impedance of the phase winding, which is a rotor angle dependent variable.

At standstill of the motor, the microprocessor 52 determines which phase should be excited to deliver torque in the desired direction by checking the inductance of all four phases. At standstill, wherein there is no voltage applied to any stator phase, the phase difference between the voltage and the current can be easily determined by connecting the phases through the multiplexer 48 to the sensing circuitry one by one. The voltage and current detected are passed through the level crossing detectors and then through the AND gate 70. The time period of the square wave output of the AND gate 70 is a function of inductance.

Figure 8:
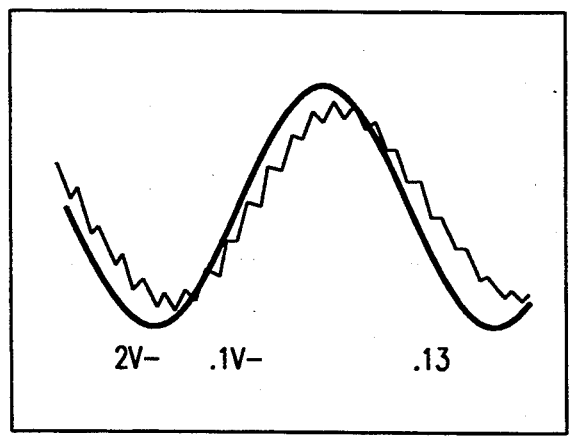
FIG. 8 illustrates the voltage and unfiltered current of the present invention across a non-excited phase stator of an SR motor when another phase is energized and aligned with the rotor.
Figure 9:
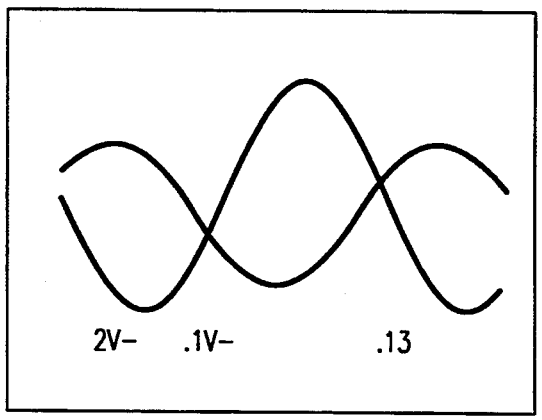
FIG. 9 illustrates the voltage and filtered current across the non-excited phase of FIG. 8.
Figure 10:
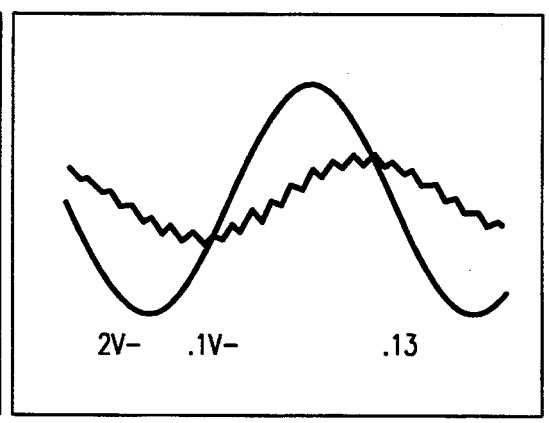
FIG. 10 illustrates the voltage and unfiltered current of the present invention across a non-excited phase when another phase is energized but not aligned with the rotor.
Figure 11:
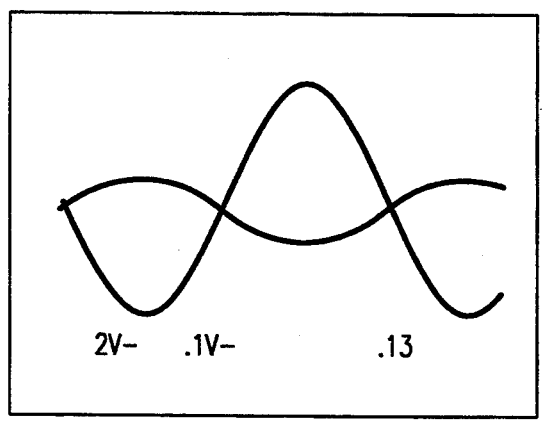
FIG. 11 illustrates the voltage and filtered current across the non-excited phase of FIG. 10.

When the SR motor is running, the torque producing phase is energized with a high frequency voltage and due to mutual coupling, a voltage of the same frequency appears in the dead or unexcited phases. When the unexcited phase is connected to the sensing circuitry of FIG. 7 through the multiplexer 48, the voltage across the resistance 54 is a sinusoidal signal superimposed by the higher frequency commutating signal applied to energize the stator phases. FIGS. 8 and 10 illustrate the voltage and current signals when the energized phase is in the aligned position and the unaligned position which corresponds to the maximum and minimum inductance, respectively. When the signal is filtered by the low pass active filter 66, the voltage and the filtered current result as shown in FIGS. 9 and 11 for the maximum and minimum inductances of the motor.

The current passing through the resistance 54 is applied to the level crossing detector 62, while the voltage across the resistance 54 is applied through the low pass active filter 66 to the level crossing detector 68. The levels of the crossing detectors 62 and 68 are judiciously set to provide maximum resolution. For example, the level of crossing detector 62 is set such that the minimum expected current is above the set threshold level. By setting the level at other than zero, the detected phase differences may be enhanced. The effect of the level detecting by detector 68 at a level other than zero also provides an amplitude detection aspect to the signal applied to the AND gate 70. The circuitry thus provides an indication to the AND gate 70 of the phase differences between the applied voltage to the unexcited stator and the resulting current in the unexcited phase, along with an indication of the amplitude of the current across resistance 54.

Figure 12:
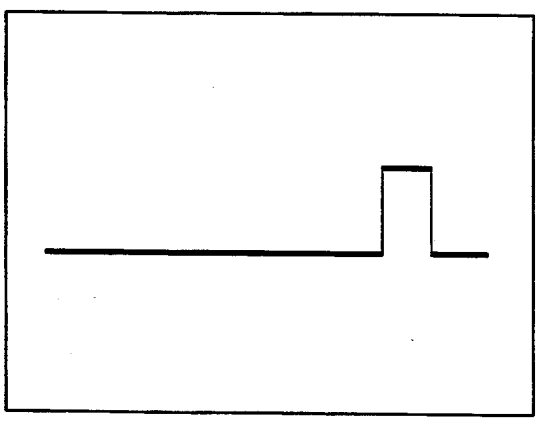
FIG. 12 illustrates the output of the AND gate of FIG. 7 at the time of FIG. 9.
Figure 13:
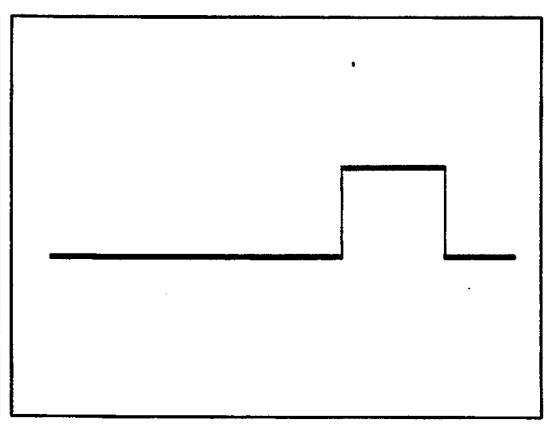
FIG. 13 illustrates the output of the AND gate of FIG. 7 at the time of FIG. 11.

FIG. 12 illustrates an exemplary output from the AND gate 70 when a Phase A is energized with a 22 kHz voltage while Phase A is in its aligned position. FIG. 13 illustrates an exemplary output of the AND gate 70 when a Phase A is energized with a 22 kHz voltage with Phase A in its unaligned position. The outputs from the AND gate 70 are detected by the microprocessor 52, which uses the sensed position of the rotor to control the operation of the MOSFET driver 44 and also to control the sense signals applied to control the multiplexer 48.

It should be understood that the level crossings of detectors 62 and 68 may be varied for various operations, and in some circumstances may be variable by the microprocessor 52. The threshold levels of the detectors 62 and 68, as previously noted, should be adjusted to provide both the advantage of change of phase and, in amplitude of current to maximize variation. The effect of the driving voltage in the SR motor does not effect the phase difference of the present circuitry. Proper filtering by filter 66, however, is used to remove the noise signal of the driving frequency. As a high resistance 54 is connected in series with the inductance of the stator winding, a change in rotor resistance due to temperature will not have a strong influence on the phase difference.

It will thus be seen that the present system provides a technique for the accurate determination of rotor position in an SR motor. This enables the advantages of SR motors to be fully implemented to provide simple and low cost: construction due to the absence of motor windings and permanent magnets. In such systems, shoot-through fault in the converters are not possible since the rotor winding is connected in series with the converter switching element. Such SR motors have simplified power electronic drive circuitry because bidirectional currents are not necessary and thus, the motors can provide sustained high speed operation due to absence of brushes. With such motors, the motors can be easily cooled because all windings are on the stator and the motors provide a low rotor inertia and high torque/inertia ratio. Even the loss of one phase of the motor does not prevent drive operation at reduced power. The present device thus enables the detection of a characteristic of a varying voltage applied to the unexcited stator in order to provide a very accurate indication of the rotor position.

Although the present invention has been described in detail, it should be understood that various changes, substitutions and alterations can be made herein without departing from the spirit and scope of the invention as defined by the appended claims.

What is claimed is:

1. A method of detecting rotor position in a switched reluctance motor having multiple stator phases which are energized in synchronism with rotor position by a commutating signal comprising:

applying a continuously periodically varying signal to a non-excited stator phase of the motor, the frequency of said varying signal being different than the frequency of the commutating signal;

detecting variances in a predetermined characteristic of said varying signal; and generating an indication of the position of said rotor in dependence upon said detected predetermined characteristic of said varying signal.

2. The method of claim 1 wherein said predetermined characteristic comprises the amplitude of the current drawn by said non-excited stator phase.

3. The method of claim 1 wherein said predetermined characteristic comprises the phase difference between the voltage and current of said non-excited stator phase and a resistance connected with said non-excited stator phase.

4. The method of claim 1 wherein said predetermined characteristic comprises the amplitude of the current drawn by said non-excited stator phase and the phase difference between the voltage and current of said non-excited stator phase.

5. Apparatus for detecting rotor position in a switched reluctance motor having multiple stator phases which are energized in synchronism with rotor position by a commutating signal comprising:

circuitry for applying a continuously periodically varying signal to a non-excited stator phase, the frequency of said varying signal being different than the frequency of the commutating signal driving the motor;

circuitry for detecting a characteristic of said varying signal; and circuitry for generating an indication of the position of said rotor in dependence upon said detected characteristic of said varying signal.

6. The apparatus of claim 5 wherein said characteristic comprises the amplitude of the current drawn by said non-excited stator phase.

7. The apparatus of claim 5 and further comprising a known resistance coupled to said non-excited stator phase said characteristic comprising the phase difference between the voltage and current of said non-excited stator phase and said resistance.

8. The apparatus of claim 5 and further comprising a known resistance coupled to said non-excited stator phase, said predetermined characteristic comprising the amplitude of the current drawn by said non-excited stator phase and the phase difference between the voltage and current of said non-excited stator phase.

* * * * *